(12) United States Patent
Fink et al.

(10) Patent No.: US 11,613,978 B2
(45) Date of Patent: Mar. 28, 2023

(54) EROSION-RESISTANT INSERTS FOR FLOW EQUIPMENT

(71) Applicant: FMC Technologies, Inc., Houston, TX (US)

(72) Inventors: Daniel R. Fink, Porter, TX (US); Julian Keihany, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 196 days.

(21) Appl. No.: 16/881,923

(22) Filed: May 22, 2020

(65) Prior Publication Data

US 2020/0284132 A1 Sep. 10, 2020

Related U.S. Application Data

(63) Continuation-in-part of application No. 16/489,091, filed as application No. PCT/US2018/016095 on Jan. 31, 2018.

(60) Provisional application No. 62/465,490, filed on Mar. 1, 2017.

(51) Int. Cl.
| | |
|---|---|
| *F16L 55/00* | (2006.01) |
| *E21B 43/26* | (2006.01) |
| *E21B 33/068* | (2006.01) |
| *F16L 57/06* | (2006.01) |
| *F16L 58/10* | (2006.01) |
| *F16L 9/14* | (2006.01) |

(52) U.S. Cl.
CPC ............ *E21B 43/26* (2013.01); *E21B 33/068* (2013.01); *F16L 57/06* (2013.01); *F16L 58/1009* (2013.01); *F16L 9/14* (2013.01)

(58) Field of Classification Search
CPC ... F16L 57/06; F16L 58/1036; F16L 58/1045; F16L 58/1009
USPC ............... 138/141, 146, 36, 42, 144; 285/55
See application file for complete search history.

(56) References Cited

U.S. PATENT DOCUMENTS

| | | | |
|---|---|---|---|
| 2,665,875 A | 1/1954 | MacGregor | |
| 2,974,684 A * | 3/1961 | Ginaven | ................. B04C 5/085 |
| | | | 209/733 |
| 3,006,381 A * | 10/1961 | Rothermel | ............. B29D 23/18 |
| | | | 138/122 |
| 3,087,645 A * | 4/1963 | Eddy | ...................... B04C 5/081 |
| | | | 55/459.1 |

(Continued)

FOREIGN PATENT DOCUMENTS

| | | |
|---|---|---|
| EP | 1624273 A2 | 2/2006 |
| WO | 2008/100724 A1 | 8/2008 |

OTHER PUBLICATIONS

International Search Report issued in PCT/US2018/016095 dated May 7, 2018 (6 pages).

(Continued)

*Primary Examiner* — James F Hook
(74) *Attorney, Agent, or Firm* — Osha Bergman Watanabe & Burton LLP

(57) ABSTRACT

A system for transporting corrosive or erosive fluids having a conduit or flow equipment with a flow bore, comprising; a flexible pipe, an adapter, an end connector, a clamp connector, insert(s), and a metal spacer. Insert(s) comprise an erosion resistant coating disposed around the internal structure that is a spring or helical structure. The insert(s) is/are disposed inside the flow bore and provide erosion and/or corrosion resistance.

18 Claims, 9 Drawing Sheets

(56) References Cited

U.S. PATENT DOCUMENTS

| | | | | |
|---|---|---|---|---|
| 3,284,106 | A * | 11/1966 | McIntosh | F16L 58/184 |
| | | | | 285/55 |
| 3,794,359 | A * | 2/1974 | Fisher | F16L 57/06 |
| | | | | 285/55 |
| 4,532,957 | A * | 8/1985 | Battle | F16K 3/316 |
| | | | | 251/266 |
| 4,737,153 | A * | 4/1988 | Shimamura | A61M 16/0425 |
| | | | | 138/131 |
| 5,104,152 | A | 4/1992 | Galfant | |
| 5,380,304 | A * | 1/1995 | Parker | A61M 25/0012 |
| | | | | 138/144 |
| 5,837,083 | A * | 11/1998 | Booth | F16L 9/165 |
| | | | | 156/190 |
| 6,125,890 | A * | 10/2000 | Cooper | F16L 55/0332 |
| | | | | 138/131 |
| 6,158,474 | A * | 12/2000 | Ishikawa | F16L 58/02 |
| | | | | 138/146 |
| 6,543,811 | B1 * | 4/2003 | Campbell | F16L 58/08 |
| | | | | 285/55 |
| 2005/0082092 | A1 * | 4/2005 | Hall | E21B 43/103 |
| | | | | 175/325.1 |
| 2005/0238461 | A1 * | 10/2005 | Lutkus | F16B 37/12 |
| | | | | 411/438 |
| 2006/0054231 | A1 * | 3/2006 | Wolfram | F16L 57/06 |
| | | | | 138/143 |
| 2009/0321181 | A1 * | 12/2009 | Ballard, III | F01N 13/1855 |
| | | | | 181/210 |
| 2016/0168970 | A1 | 6/2016 | Kajaria et al. | |
| 2016/0356413 | A1 * | 12/2016 | Zhan | F16L 9/047 |

OTHER PUBLICATIONS

Written Opinion issued in PCT/US2018/016095 dated May 7, 2018 (8 pages).

\* cited by examiner

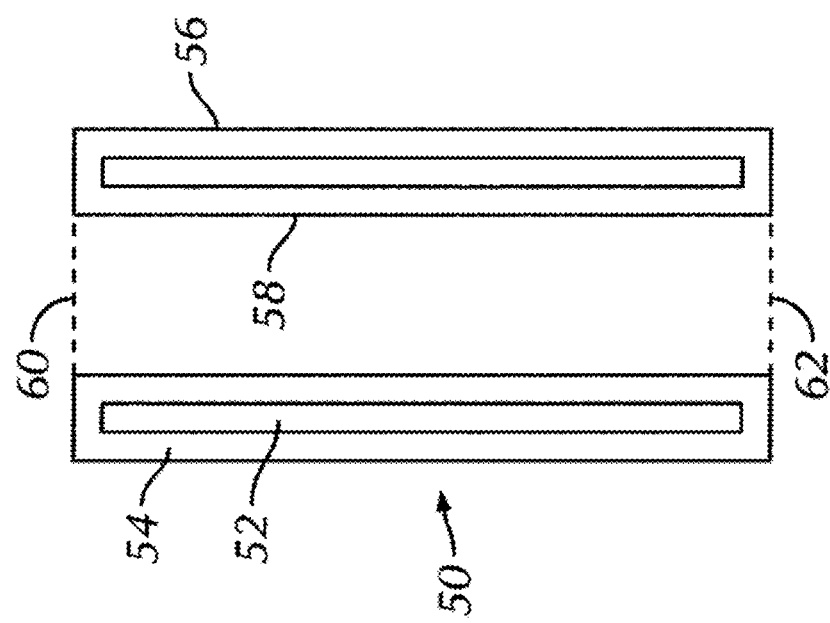
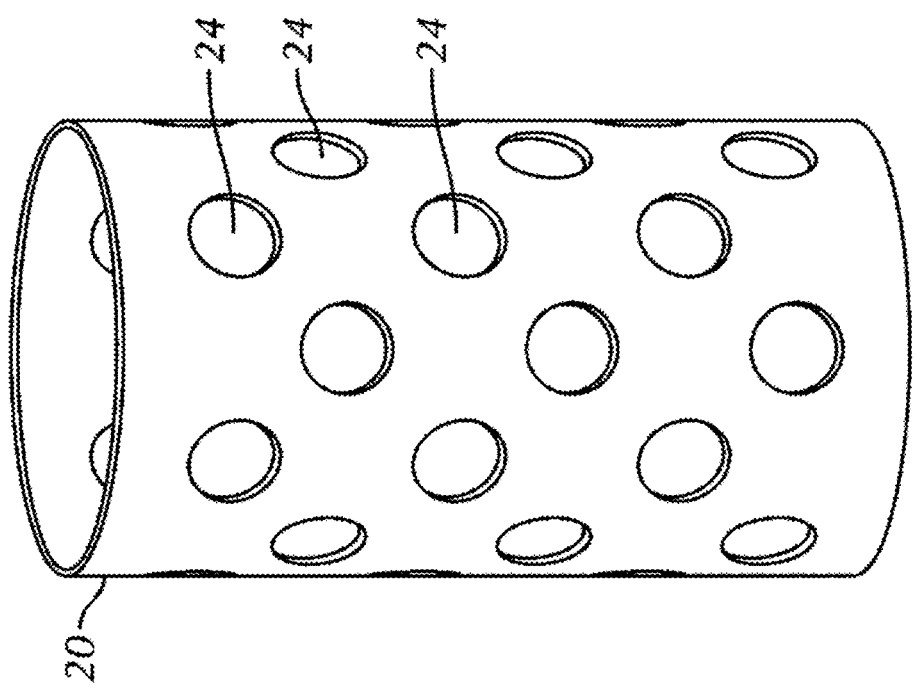

EROSION-RESISTANT INSERTS FOR FLOW EQUIPMENT

BACKGROUND

US20160168970 describes a method for bonding a urethane layer to the equipment. In this method, a urethane nozzle is inserted into the equipment and a urethane coating is applied to the inside of the equipment. Various other methods have been proposed to spin cast, dip cast, or gravity cast piping or other flow components with polyurethane. These are difficult processes and it is difficult to bond the equipment and urethane correctly. Additionally, when the layer is damaged or worn, the entire pipe, valve, etc. must be replaced or taken out of service until the urethane can be replaced.

SUMMARY OF THE CLAIMED EMBODIMENTS

Embodiments disclosed herein are configured to provide the benefits of erosion resistant coatings, such as urethane, without the drawbacks of dealing with worn or damaged flow equipment.

In one aspect, embodiments disclosed herein relate to a system for transporting corrosive or erosive fluids having a conduit or flow equipment with a flow bore therein and an insert disposed within the flow bore. The insert includes an internal structure having a structure of a spring or a helically wound coil, and an erosion or corrosion resistant coating is disposed around the internal structure. The insert disposed inside the flow bore provides erosion and/or corrosion resistance to the flow bore.

In another embodiment disclosed herein is a system for transporting corrosive or erosive fluids having a flexible pipe, an adapter, and end connector, a clamp connector, and two or more inserts disposed within flow bores of the adapter and end connector. Each of the inserts include an internal structure having a structure of a spring or a helically wound coil, and an erosion or corrosion resistant coating is disposed around the internal structure. The system further includes interface seals disposed on complementary overlapping structures of the two or more inserts and fit to a mechanical engagement of the insert. The interface seals protect the clamp connector from erosion or corrosion.

In another embodiment disclosed herein is a method for manufacturing an insert for providing corrosion and erosion resistance to flow equipment. The method includes: disposing a helical structural component within an annular cavity of an injection molding apparatus; stretching and loading the helical structural component in tension to achieve a desired spacing and rigidity of the helical structural component; injecting a polymeric or rubber coating into the annular cavity; and solidifying the polymeric or rubber coating to form an insert comprising the tensioned helical structure within the solidified polymeric or rubber coating.

Other aspects and advantages will be apparent from the following description and the appended claims.

BRIEF DESCRIPTION OF DRAWINGS

FIGS. 1 and 1A are an illustration of an internal structure of an insert according to embodiments disclosed herein.

DETAILED DESCRIPTION

Figure 2:
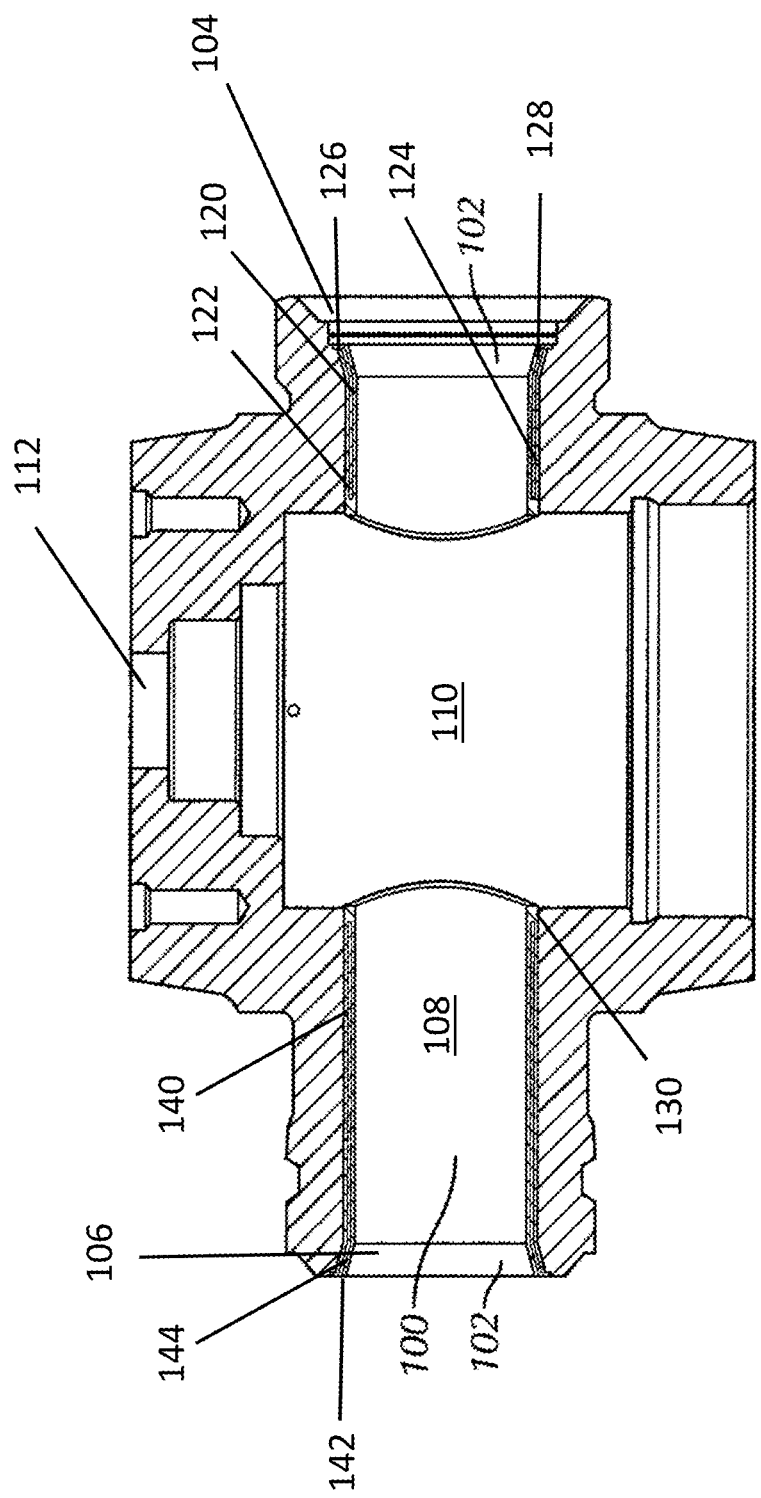
FIG. 2 is an illustration of a plug valve including an insert according to embodiments disclosed herein.

In one aspect, embodiments herein relate to a system for an erosion-resistant insert that significantly decreases the erosion that may occur in conduits and flow equipment, such as those used in fracing and flowback operations. Examples of such equipment include, but are not limited to, pipes, joints, swivels, manifolds, frac heads, valves, etc. By using the erosion-resistant inserts, the life of the conduits and equipment may be extended, which is beneficial to many types of operation models, especially those in sand-laden slurry operations or other systems that may encounter erosive fluid mixtures.

The erosion-resistant inserts may include structures having an erosion resistant coating designed to fit inside a flow bore of the conduit or flow equipment. The coated inserts include an internal structure that provides support for the erosion resistant coating during the manufacturing process, installation within flow equipment, and use. The erosion resistant coating may be formed, for example, from a urethane resin or other types of resins or pre-polymer mixtures (epoxy, urea, etc.) that may be coated, cured, and shaped around the internal structure.

The erosion-resistant inserts may be designed (shape, thickness, etc.) based on a conduit or flow equipment within which it is to be positioned. For pipes and other flow equipment having cylindrical flow bores, the insert may also be generally cylindrical in shape and designed to fit within the pipes and equipment; other shapes, such as square pipe or others known in the art are also contemplated. The internal structure of the insert may be sized with knowledge of the conduit or flow equipment, and the insert may then be coated with urethane cured to a desired thickness.

The erosion-resistant inserts may be provided with one or more tapered ends that aid in fitting the insert in the equipment. Additionally, the erosion-resistant inserts may be provided with one or more cut outs or joint sections to facilitate more complex equipment geometries such as angles, tees, and intersections. Further, the inserts may be provided with one or more portions or ends designed to facilitate joining inserts together, such as overlapping ends to accommodate complex geometries or unsupported ends to facilitate an interference fit to effectively seal the interface.

In some embodiments, such as for pipe joints, erosion-resistant inserts may be long in comparison with diameter. This may allow for the use of fewer total inserts for a given equipment structure. Additionally, through the use of cut outs and joint sections, inserts may be designed in several standard sizes and arrangements, thus reducing the total number of different inserts that may need to be produced and reducing complexity of the manufacturing process.

Erosion-resistant inserts according to one or more embodiments disclosed herein may be manufactured to fit any type of conduits and equipment, including valves, pup joints, adapter hubs, tees, frac heads, valves etc., provided the internal geometry of the flow bore is known. With knowledge of the internal geometry, the insert structure can be created so that it fits inside the conduit or flow equipment with a particular tolerance and gap to accommodate the urethane coating.

The arrangement of the internal structure and coating may provide for increased rigidity and integrity of the inserts compared to conventional spray-in inserts. Additionally, the increased integrity provided by the internal structure may be beneficial when removing the insert for maintenance or replacement.

The internal structure can be made of any material that can withstand the coating process and provides sufficient resilience to provide an initial sealing force between the erosion-resistant coating and the flow bore of the conduit/equipment. Example materials include perforated metal, wire mesh, glass-coated nylon, and helically wound coil, among others.

As illustrated in FIG. 1, an internal structure 20 may be an elongated structure with a plurality of openings therethrough. In the embodiment shown, the internal structure 20 comprises a tubular steel element and the plurality of openings are in the form of circular perforations 24. It should be appreciated that the openings through the internal structure 20 are not limited to the shape, number, size, and orientation of the perforations 24 shown in FIG. 1.

Once the internal structure is formed, an erosion-resistant coating can be applied to the structure. The perforations 24 provide openings that can be filled with the erosion-resistant coating material, such as urethane resin, to better secure the erosion-resistant coating to the structure 20. For example, the internal structure 20 may be coated by dipping the internal structure 20 into a urethane resin until the desired amount of urethane is applied. Other methods to coat the internal structure 20 may include casting, injection molding or compression molding.

A cross-section of a resulting cylindrical insert structure 50 is illustrated in FIG. 1A. An insert 50 includes an internal support structure 52, which may be similar to the structure 20 of FIG. 1, coated with an erosion-resistant coating 54, such as a polyurethane. While illustrated as a simple cylinder, various shapes and configurations may be made, for example, by shaping the internal support or the erosion-resistant coating, as described below. The resulting structure has an outer surface 56 that may engage with the flow bore of the flow equipment (not illustrated), an internal surface 58 providing a flow bore through the insert, and ends 60, 62 that may engage or overlap various portions of the flow equipment, abutting flow equipment, or other inserts to provide desired (complete or substantially complete) coverage of the internal surface of the flow equipment.

The erosion-resistant material used to form the coating on the internal structure may be, for instance, formed from any resin known in the art to provide corrosion and/or erosion resistance. Example coatings include resin systems used in forming epoxies, polyurethanes, and polyureas, among others. Additionally, different urethane types may be used, including resins of esters, ethers, ester-poly blends that provide the desired sealing characteristics. Additionally, additives may be provided with the urethane material to increase resilience, hardness, increase longevity, provide different surface characteristics, grip with the equipment, etc. Such additives may include various ceramics, ceramic beads, silicon based particles, sand, or other additives that enhance the desired properties.

The internal structure and/or coating can also include one or more mechanical engagement features that may be used to secure or align the insert within the conduit/equipment. In one or more embodiments, mechanical engagement feature may include a lip, a tapered end, or other features on one of the ends of the internal structure that is sized to engage with a seal pocket of the conduit/equipment.

Referring now to FIG. 2, a plug valve 100 including inserts according to embodiments herein is illustrated. Plug valves may be symmetric (having similar ends), or asymmetric, as illustrated, including a valve body 102 having an end 104 and an end 106 that are configured as "male" or "female" ends to facilitate connection to pipes or other equipment (not illustrated) in a desired manner. The plug valve 100 may include an internal flow bore 108 separated by a plug 110 operated by stem 112. The plug valve includes packing, seals, and other parts as known in the art, but not described here.

Disposed in end 104 is an insert 120 according to embodiments herein. The insert includes an internal support structure 122 coated with a polyurethane or another erosion-resistant coating 124. The polyurethane coated structure 120 may include a lip 126 and a tapered section 128 that may provide mechanical engagement with the equipment structure. This mechanical engagement may function to laterally secure the insert within the conduit/equipment. For example, the lip 126 may abut a portion of downstream pipe, when connected, and the lip 126 and tapered section 128 may provide support, each securing the insert in place within the bore 108 of the plug valve 100.

Insert 120 may also include an unsupported end 130, the internal structure 124 not extending fully to the end of the portion of the insert that abuts plug 110. This portion of the insert may effectively abut and/or seal against the plug, providing a surface that protects the valve body against erosion up to the plug.

A similar insert 140 may be disposed in end 106. End 106 may be adapted to receive a male connector, extending partially into end 106. Insert 140 may thus include a lip 142 and taper 144 that are designed to be fit within the valve, accounting for the different type of connection and allowing the insert to be secured in place once connected and prevent lateral movement. In some embodiments, the support structure and/or erosion-resistant coating may have some degree of flexibility, allowing the lip to be compressed slightly during insertion and "snapped" into place within a pocket of formed in the valve body.

Figure 3:
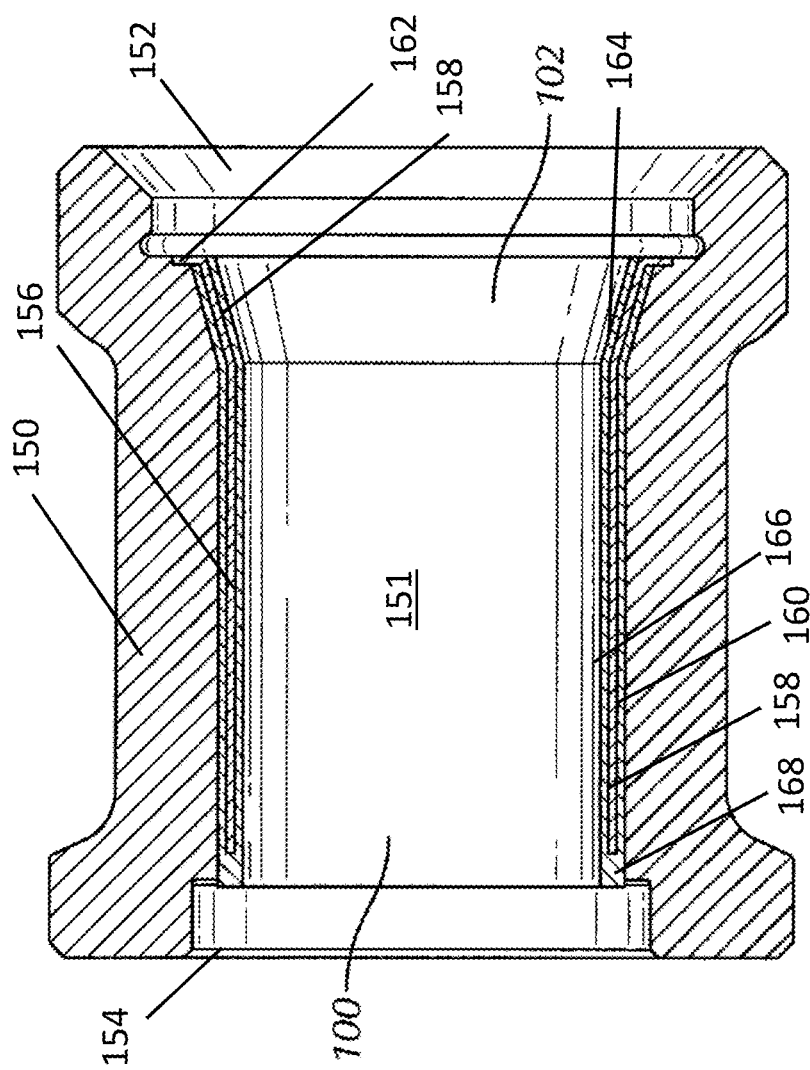
FIG. 3 is an illustration of an adapter hub including an insert according to embodiments disclosed herein.

Referring now to FIG. 3, an adapter hub 150 including an insert according to embodiments herein is illustrated. Adapter hub 150 may include body 151 and two female ends 152, 154 adapted to receive male connectors that may be partially inserted into and abut at least a portion of the insert 156. Insert 156 may be similar to the inserts described with respect to FIG. 2, and may include internal structure 158, insert material (erosion-resistant coating) 160, lip 162, taper 164, bore 166, and unstructured end 168. While illustrated as an adapter hub including two female ends, inserts may be designed for adapter hubs and other components herein having two male ends or one male end and one female end.

The tapered ends, tabs, and/or lips of the inserts may be formed in many different ways. For example, the taper may be generated when the internal structure is formed. The tapered end or lip may also be provided by modifying the internal structure after it is formed. Alternatively, the tapered end and/or lip may be formed by the coating, either during the coating or molding process, or after the coating or molding process by removing material necessary to form the tapered end, lip, or other desired structure.

FIGS. 2 and 3 were directed toward a flow equipment that may include only one tapered end or may have been relatively short in length. Inserts according to embodiments herein may be designed, shaped, and configured for insertion into more complex or longer flow equipment bores, as illustrated and described with respect to FIGS. 5-8. Such flow equipment may be protected from erosion by use of two or more inserts.

Figure 4:
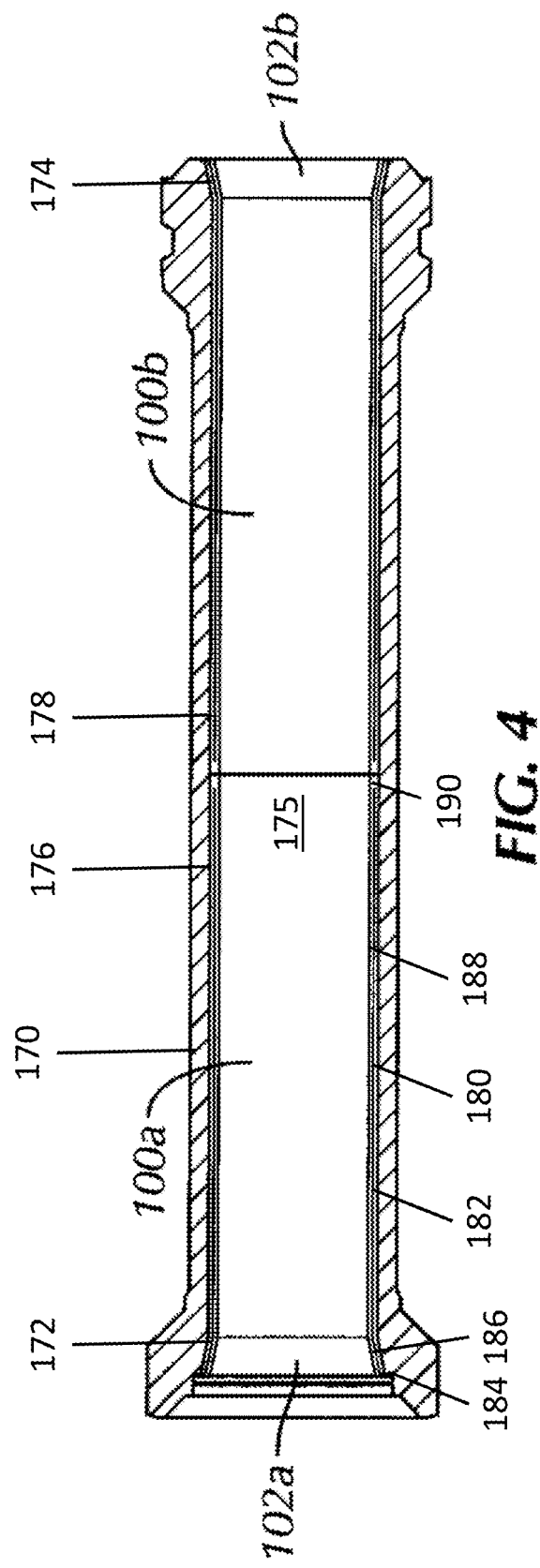
FIG. 4 is an illustration of a pup joint including an insert according to embodiments disclosed herein.

FIG. 4 illustrates a pup joint 170 including erosion-resistant inserts according to embodiments herein. As the pup joint 170 includes two tapered ends 172, 174, full coverage of the pup joint flow bore 175 may be provided by use of two inserts 176, 178, inserted in the respective ends. Inserts 176, 178 may be formed from an internal structure 180 and coating 182, and may each include a lip 184, taper 186, bore 188, and ends 190. The ends 172, 174 of the pup joint bore are protected in a manner similar to that described above with respect to FIGS. 2 and 3.

What is undesired, however, is a gap in coverage in the middle of the pup joint. Inserts according to embodiments herein may be designed so as to abut or overlap, with no or minimal clearance, providing an effective seal between the inserts, eliminating or minimizing contact of erosive material with the bore of the pup joint. As illustrated in FIG. 4, ends 190 of the inserts include an unsupported (no internal structure) section of coating 182. When the inserts are axially secured, the unsupported ends may be forced together in an interference fit that effectively seals the interface. In other embodiments, the unsupported portions of the coating may abut, overlap, or include geometry (interlocking portions, such as a tab and insert or others) or complementary features that create a seal between the ends of the inserts so that pressurized fluid is contained within the flow bore of the insert.

It is also contemplated to utilize a sealant, such as a low temperature curing resin, that may cure upon seating of the two ends 190. In such embodiments, the sealant or resin used may form a relatively low strength bond between the two ends 190, sealing the interface while not significantly hampering efforts to remove the inserts when replacement is needed.

Use of multiple inserts may be necessary due to the length or configuration of the conduit in which the insert is desired to be disposed. When possible, it may be desired to have both inserts be of similar configuration. Producing identical parts may reduce the cost of the individual inserts and would make field installation simpler, as there may be no need to determine which piece goes in which end of the pup joint, for example.

Figure 5:
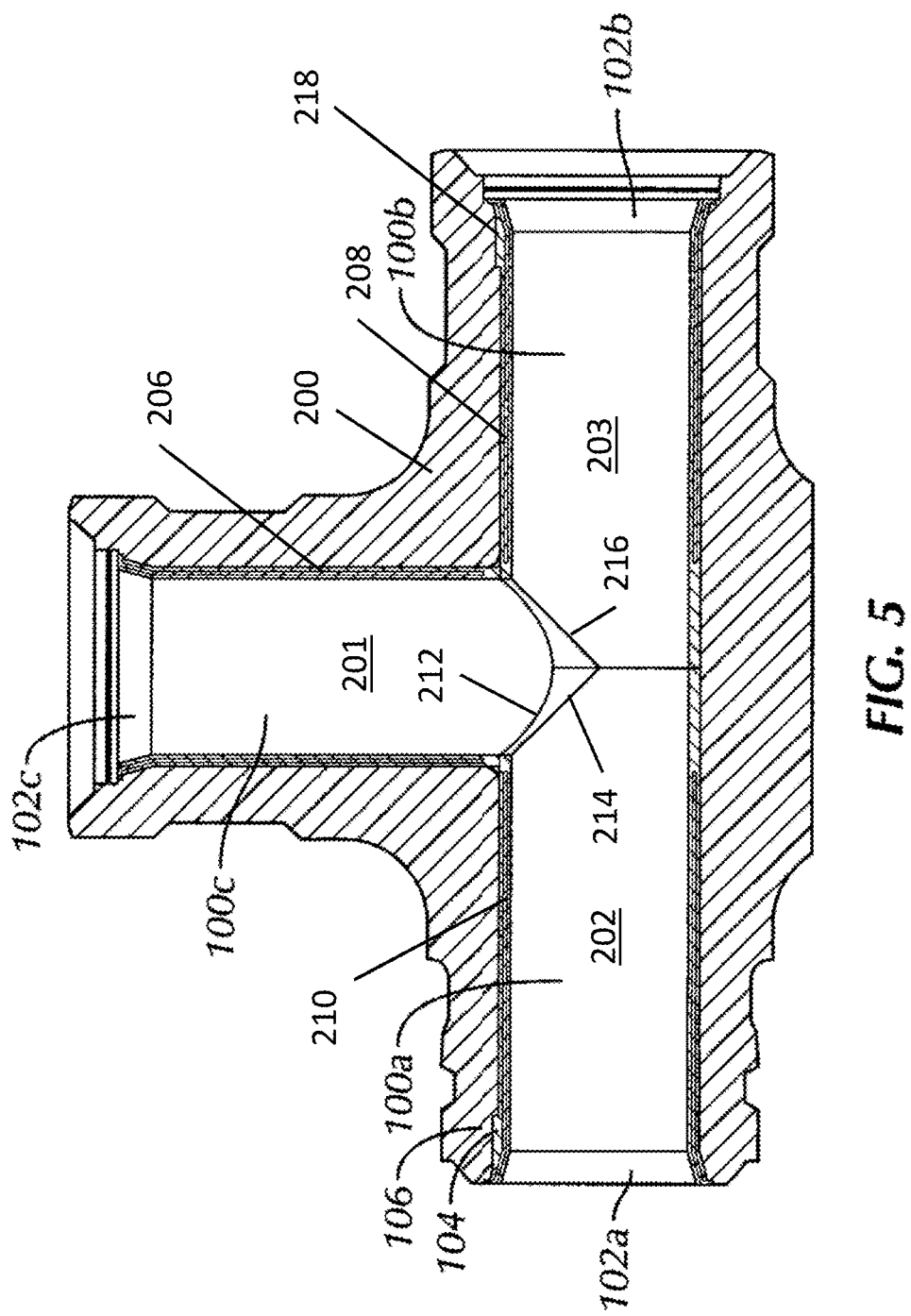
FIG. 5 is an illustration of tee including inserts according to embodiments disclosed herein.
Figure 6:
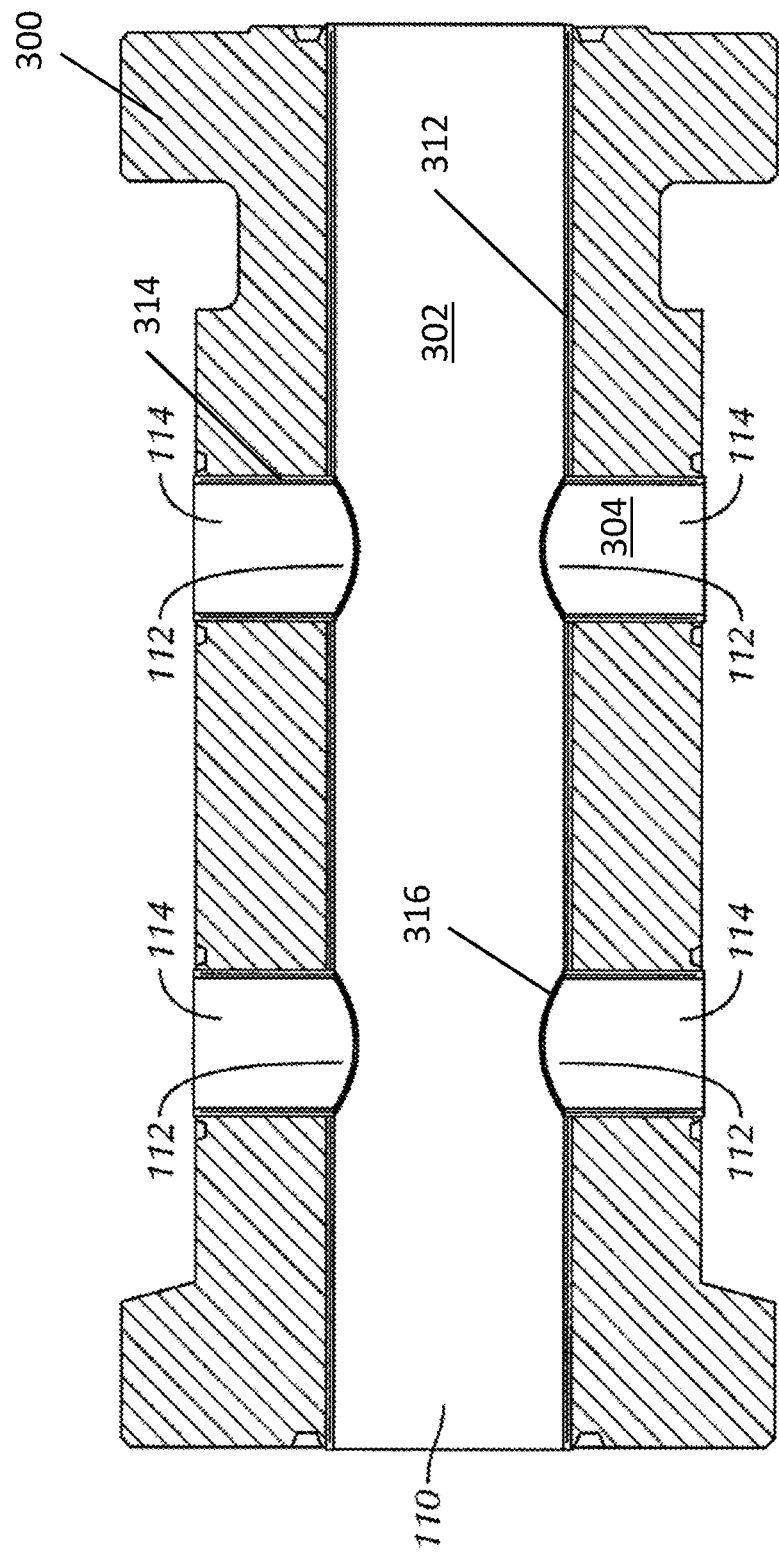
FIG. 6 is an illustration of a goat head including inserts according to embodiments disclosed herein.

In one or more embodiments, the equipment or conduit may have a significantly more complex structure, such as a tee or a goat head as illustrated in FIGS. 5 and 6. Referring to the tee illustrated in FIG. 5, tee 200 may include three flow bores 201, 202, and 203. Each flow bore may terminate at a male or female connection, for example, an end may include tapering, similar to the flow equipment as described above with respect to FIGS. 2-4. Protection of the flow bores of the tee may be provided by three inserts 206, 208, 210. The inserts may include tapers, lips and bores, similar to other embodiments. The interfaces 212, 214, and 216 between the respective inserts is designed to provide a seal between the insert ends, which may be achieved similar to that as described above by using an interference fit, overlaps, or other features to prevent or minimize contact of erosive fluid with the tee body proximate the interfaces.

An additional mechanical engagement feature (not illustrated) may also be included on one or more of the inserts, such as a molded radial extension 218 in the urethane coating, as illustrated in inserts 208, 210. The radial extension 218 may engage a machined groove 106 in the flow equipment, and may function to rotationally align the inserts within the flow equipment. This may be useful where there is a feature elsewhere along the insert that must rotationally align with a complementary feature in the flow equipment, such as a side bore in a tee branch (illustrated as bore 201) and/or an insert in such a side bore (illustrated as insert 206). The molded radial extension 218 may be produced similar to the tapered ends. That is, the molded radial extension may be formed in the internal structure or by modifying the internal structure after it is formed. Additionally, the molded radial extension may be made from the erosion-resistant coating either during the application or molding process, or after application by physically manipulating the coating material.

As noted above, when multiple inserts may be used in the same conduit or equipment, such as where bi-directional flow is possible or the geometry is too complicated to create a single insert, the interface between the inserts must be sealed to prevent particulates and/or acid (when inserts are used for corrosion protection) from contacting the metal structure of the conduit or equipment. In such embodiments, the inserts may be slightly oversized, with the oversized portion at least partially consisting of an unsupported urethane section. When two such inserts are placed next to each other and the inserts are axially secured, the unsupported ends may be forced together in an interference fit that effectively seals the interface. In other embodiments, the unsupported urethane portions may abut, overlap, or include some other sort of geometry that creates a seal between the ends of the inserts so that pressurized fluid is contained within the flow bore of the inserts.

In one or more embodiments, such as illustrated in FIG. 2, the insert may abut a ball or plug of a valve, or other flow control member with a rotating or sliding part. In such embodiments, the insert may need to be designed with a very tight tolerance. A tapered end, either supported or unsupported, may be required to completely seal the end of the insert against the valve or other equipment. Such an arrangement may be necessary to prevent liquids or gases, in some cases acidic, from contacting the equipment or pipe wall and causing undue corrosion. The design should be such that there is a dynamic seal formed between the insert and the rotating or sliding part, where the seal surface has enough resistance to flow that solids traversing through the valve may not migrate between the insert and the ball or plug, as such would cause undesired erosion.

Illustrated in FIG. 6 is another example of a more complex structure, a goat head or other type of injection block including multiple inlet and/or outlet bores, which may include protective inserts according to embodiments herein. As illustrated, goat head 300 may include a primary bore 302 and four side bores 304. To provide corrosion resistance to such a structure using inserts according to embodiments herein, a main insert 312 may be provided having four cut-outs (gaps in structure) 114 configured to align with each of the side bores 304. Each of the side bores 304 may contain an insert 314 disposed within the bores. The side bores may be of the same or different bore size, and may include the same or different end configurations, and as such the inserts may be the same or different, as required for the structure of interest.

The side bores 304 and main insert 312 may have complementary sections for sealing the flow bore and protecting the internal surfaces of the goat head. The complementary surfaces, as described earlier, may be provided at interfaces formed when the interior end 316 of the side bore inserts abuts or engages main insert 312. The complementary surfaces may be designed to provide a seal between the inserts 314 and the main insert 312, and may be achieved by using an interference fit, overlaps, or other features to prevent or minimize contact of erosive fluid with the tee body proximate the interfaces.

Figure 7:
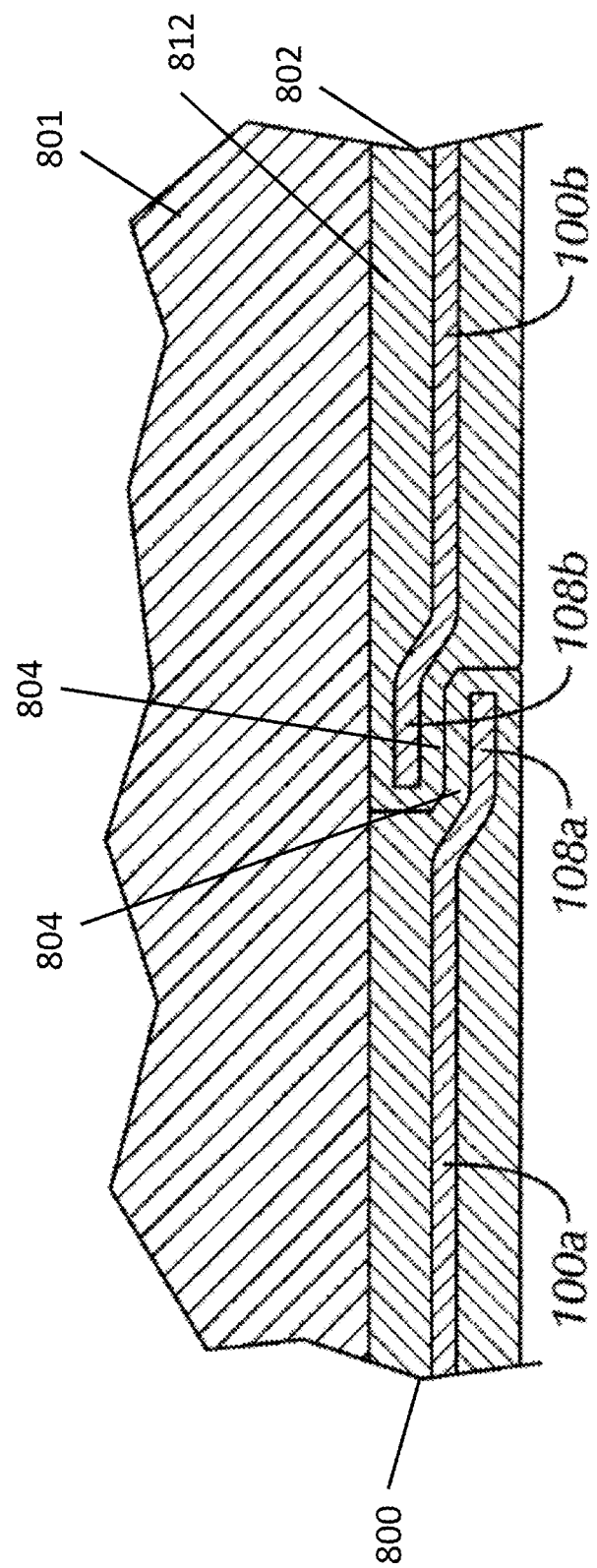
FIG. 7 is an illustration of a feature of an insert according to embodiments disclosed herein.

An example of such complementary sections is illustrated in FIG. 7, illustrated for a straight section of pipe 801. As illustrated in FIG. 7, inserts 800 and 802 may have complimentary overlapping sections 108a, 108b, forming a sealing interface. Each insert 800, 802 may include an internal support structure 100a, 100b surrounded by an erosion-resistant coating 812. The internal structures, rather than being straight, may be complementary in shape, facilitating the overlap and seal, and providing structural support for the overlapped sections 804, 806, such that the inserts may be retained in position and effectively seal when fluid is passed over the surface of the inserts. Although the shape of the internal supports 100a, 100b vary between inserts 800, 802, the overall shape of the inserts 800, 802 may be such that the internal diameter of the insert is consistent, providing a uniform diameter of the flow bore over the length of the combined inserts. Inserts having similar complimentary end or interface sections may be used for tees, having 90-degree bends, or other structures that may include bends of a different angle. Tortured, close fitting paths are expected to provide a better seal than straight interfaces.

The insert structures may thus be designed so that the one or more inserts completely seal the insert against the pipe or other equipment. Such an arrangement may be necessary to prevent erosive and/or corrosive liquids or gases from contacting the equipment or pipe wall and causing undue corrosion. This may be accomplished by providing a complementary geometry such as the one illustrated in FIG. 7 or other geometries such as wedges, circular arches, and triangular sections. In one or more embodiments, multiple repeated geometries may be provided, one on top of the other, to create multiple redundant seals to further aid in protection of the pipe or equipment. In addition, by overlapping the internal structures, the entire length of the coating is supported, which is beneficial in larger bore applications where the tendency of the coating, such as a polyurethane, to contract could cause unsupported sections to buckle inward and compromise the seal.

Without modification, the thickness of the insert may reduce the flow bore size in an undesirable way for some applications. In such embodiments, the flow bore of the conduit or equipment may be machined slightly larger than is normal, to accommodate the insert. This is generally possible with typical conduit and equipment used in corrosive or erosive service, which are manufactured to provide a wear cushion. Oversizing the flow bores to accommodate the inserts may be accomplished by reducing or eliminating the typical wear cushion.

Although not depicted, one or more intermediate inserts may be used between "end" type inserts, such as for the pup joint shown in FIG. 4, for example. These intermediate inserts may include, for instance, straight internal structures with unsupported urethane sections, or some other sealing feature, on both ends for sealing to adjacent inserts. This may be useful, for instance, in long pup joints, where standard-sized "end" type inserts are used and the distance between the "end" type inserts is spanned by one or more intermediate inserts of known length, such as 1 ft, 2 ft, 3 ft, etc. This may limit the number of insert sizes and configurations that must be produced, further reducing the price of a given insert.

Figure 8:
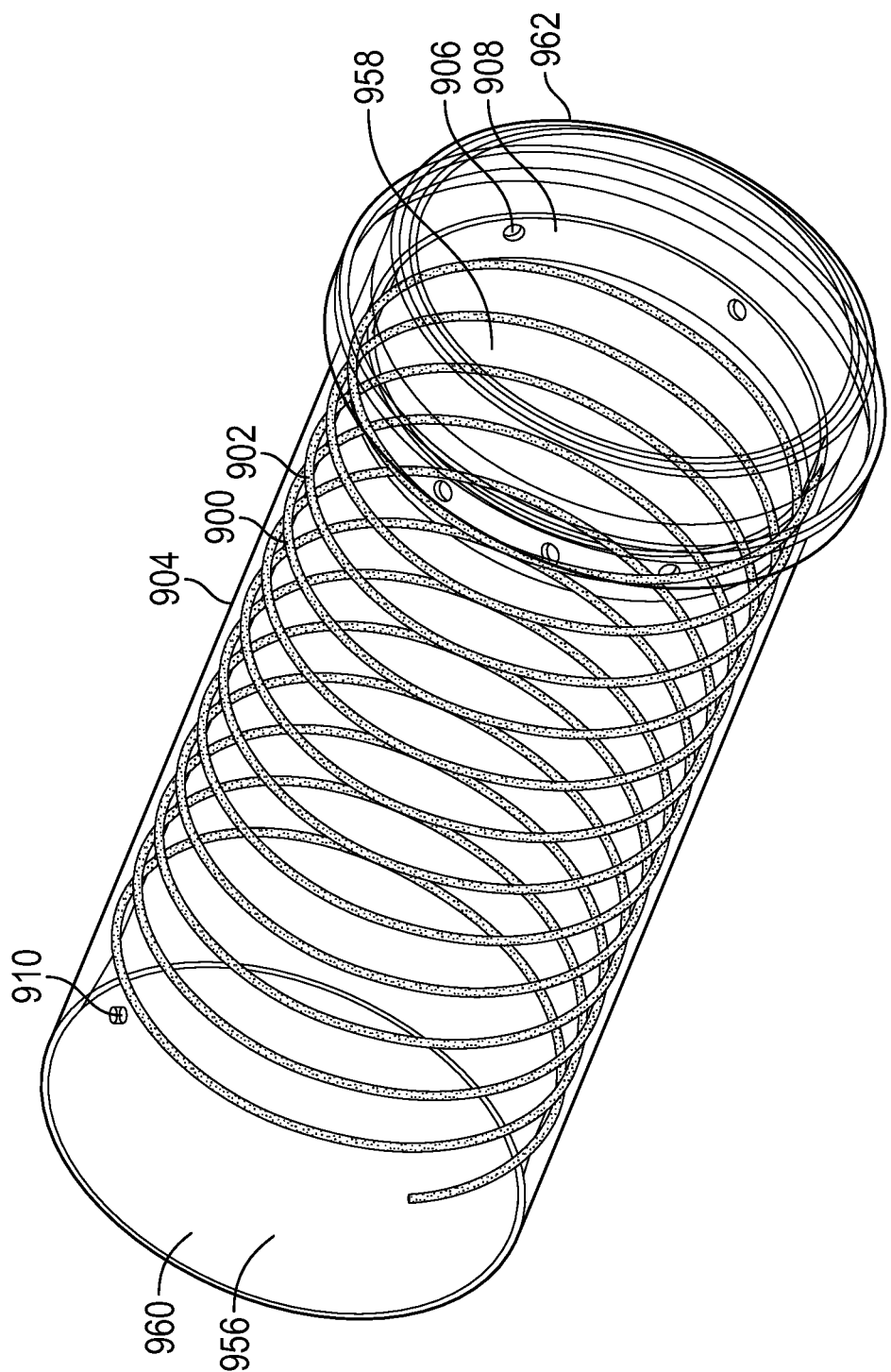
FIG. 8 is an insert disposed within a flow bore according to embodiments disclosed herein.

According to one or more embodiments, an insert 900 may include an internal structure 902 that is a spring or a helically wound coil supporting a corrosion resistant coating 904, as illustrated in FIG. 8. As with the embodiments of FIGS. 1 and 1A, the resulting structure has an outer surface 956 that may engage with the flow bore of the flow equipment (not illustrated), an internal surface 958 providing a flow bore through the insert, and ends 960, 962 that may engage or overlap various portions of the flow equipment, abutting flow equipment, or other inserts to provide desired (complete or substantially complete) coverage of the internal surface of the flow equipment.

Further, the internal structure and/or coating can also include one or more mechanical engagement features that may be used to secure or align the insert within the flow line/equipment and/or to assist in forming the insert. In one or more embodiments, the one or more mechanical engagement features may include a lip, a tapered end, or other features on one of the ends of the internal structure that is sized to engage with a seal pocket of the conduit/equipment.

As illustrated in FIG. 8, for examples, in some embodiments the internal structure may include locator holes 906 distributed around an end section 908, which enables coupling between the internal structure and an installation device through pins or hooks (not shown) during an installation or replacement of the insert within the flow bore. For example, the locator holes 906 are hooked with an installation device to move the insert 900 within the flow bore to place and fix the insert 900 to a desired location. Locator holes 906 may also be used, for example, during a process for emplacing the erosion resistant coating around the internal structure, as described further below.

Figure 9:
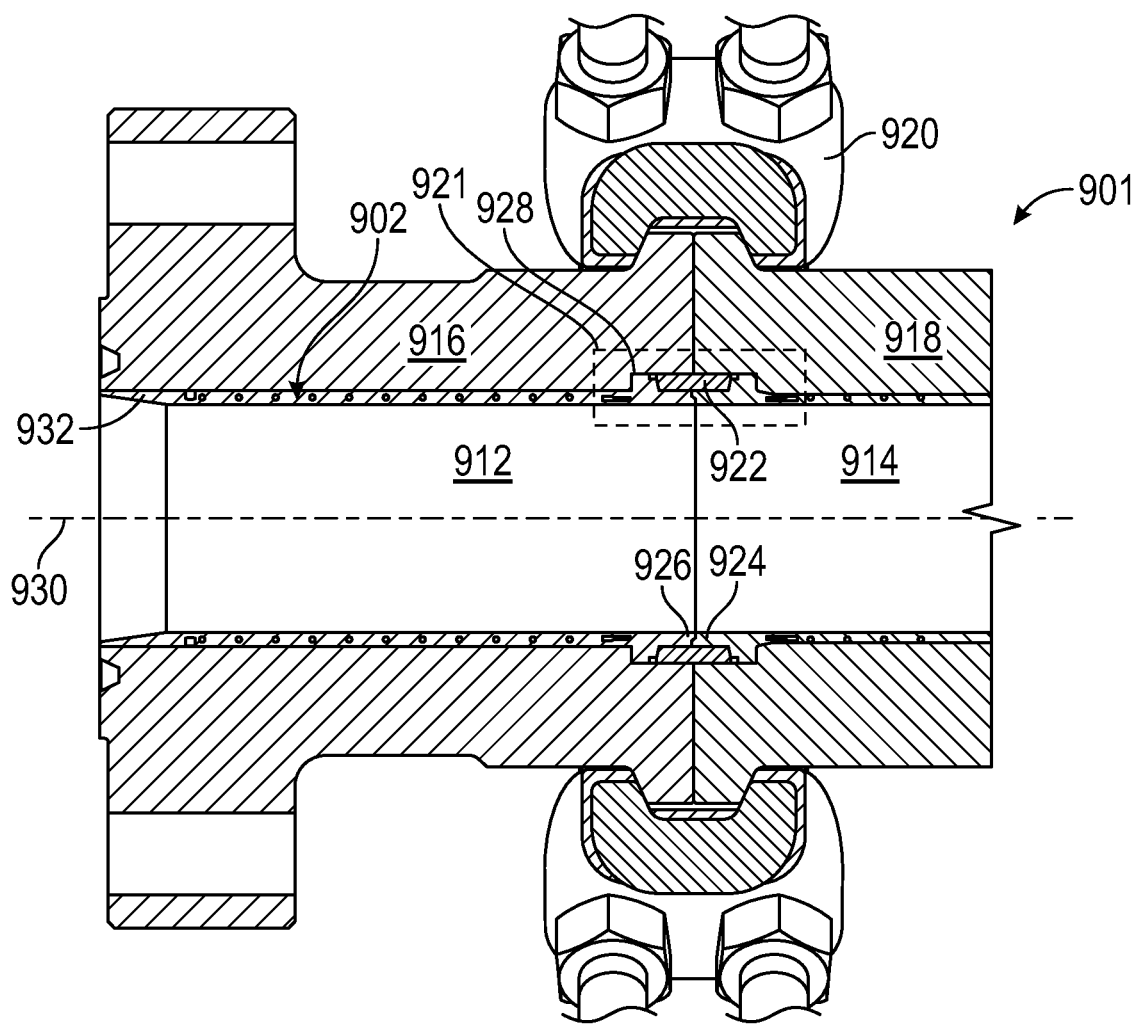
FIG. 9 is a cross-sectional view of the system for transporting fluids according to embodiments disclosed herein.

As illustrated in FIG. 8, and better visualized in FIG. 9, the one or more mechanical engagement features may also include a tapered end (end 960) and a flanged or lip portion 928 (proximate end 962). The flanged portion 928, for example as illustrated in FIG. 9, may be configured to fit into a corresponding recess of the flow bore 912 of flow equipment and to hold the insert 900 in place while fluid is flowing within the flow bore 912. During the installation or the replacement of the insert 900 within the flow bore 912, the internal structure 902 may be inserted or fixed at one end and moved with pins in the locator holes 906 until the insert 900 is moved to a desired location and the mechanical engagement 928 are fit into the corresponding features of the flow bore, as illustrated in FIG. 9.

As also illustrated in FIGS. 8 and 9, the mechanical engagement features may also include a tapered end 932, as well as an overlap taper 926, which may be configured to overlap with a correspondingly tapered end 924 of an adjacent insert. Further, the insert 900 may include an end extension between flange 928 and end 926. The extension may be sized, for example, to engage and hold a metal spacer 922 in the recess, such that a seal may formed between abutting flow components 916, 918. The mechanical engagement 928 may include an insert seal and an anti-extrusion ring for improving the seal between the abutting flow components 916, 918. The metal spacer 922 provides compression to the mechanical engagement 928 which ensures that the internal structure 902 of the insert 900 remains in position and provides further blocking of any possible leaks from the flow bores 912, 914. The metal spacer 922 is a ring, and other various shapes of the metal spacer 922 that corresponds to mechanical engagement features or other combination of mechanical engagement features may also be used.

As alluded to above, a system 901 in accordance with one or more embodiments disclosed herein may include two or more inserts 900 disposed within the respective flow bores 912, 914 of flow equipment 916, 918, as illustrated in FIG. 9. The flow equipment 916, 918 may be any adjoining flow components, as illustrated, and which may be desired to both have an insert according to embodiments herein disposed. For example, flow equipment 918 may be an end connector or an end portion of a pipe, and flow equipment 916 may be an adapter, such as an adapter for transitioning to a flanged connection 921.

The system 901 may include, for example, a flexible pipe (not shown) for flow at high pressure, an adapter 916 connected to a wellhead (not shown), an end connector 918 connected to the adapter 916, a clamp connector 920 holding the adapter 916 and the end connector 918 together, and a metal spacer 922. The adapter and the end connector disclosed herein may be general flow equipment that have flow bores within. The inserts 900 disposed within the flow bores 912, 914 of the adapter 916 and the end connector 918 are sealed through complementary overlapping structures 924, 926, which prevents the flowing fluid from leaking to a clamp connector 920. The clamp connector 920 holding the adapter 916 and the end connector 918 is further protected from fluid contact because the metal spacer 922 disposed on the overlapping structures of the inserts 924, 926 further improves sealing by blocking any fluid leaking additionally above the overlapping structures of the inserts. This metal spacer 922 may also fit to the corresponding features of the flow bores 912, 914, as illustrated in FIG. 9.

Embodiments herein may also be directed toward manufacture of an insert 900. According to one or more embodiments disclosed here, an insert 900 may be manufactured by disposing a spring or helically wound coil 902 within an annular cavity of an injection molding apparatus. Using locator holes 906, the spring or the helically wound coil 902 may be stretched and loaded in tension to achieve a desired spacing between the coils and rigidity to support the corrosion resistant coating disposed within the annular cavity around the internal structure 902 of the insert 900. As a non-limiting example, the spring constant of the internal structure may be known prior to the manufacturing process to set a tolerance value for the coil spacing or the load in tension. This step ensures that the internal structure 902 is sufficiently firm to support the corrosion resistant coating, thus the insert 900 is structurally stable overall.

The process of manufacturing such inserts further includes injecting corrosion resistant coating, such as polymeric or rubber coating as explained above, into the annular cavity. Once the polymeric or rubber coating is disposed around the helical structure, fully covering the inner surface of the annular cavity of the injection molding apparatus, the polymeric or rubber coating is solidified around the internal structure, thus forming the complete insert having a tensioned helical structure within the solidified polymeric or rubber coating.

The inserts, as explained in other embodiments above, may abut a ball or plug of a valve, or other flow control member with a rotating or sliding part. In such embodiments, the insert may need to be designed with a very tight tolerance. A tapered end, either supported or unsupported, may be required to completely seal the end of the insert against the valve or other flow control member. Such an arrangement may be necessary to prevent slurries, liquids or gases from contacting the equipment or pipe wall and causing undue corrosion. The design should be such that there is a dynamic seal formed between the insert and the rotating or sliding part, where the seal surface has enough resistance to flow that solids traversing through the valve may not migrate between the insert and the ball or plug, as such would cause undesired erosion.

As described above, embodiments disclosed herein are directed toward inserts. The inserts significantly decrease the erosion that occurs in conduits and equipment used in fracing and flowback. By using the inserts, the life of the conduits and equipment can be extended. In some embodiments, the internal structure and/or the resin coating may also include one or more mechanical engagement features that secure or align the insert within the conduit/equipment. This mechanical engagement may function to laterally secure the insert within the conduit/equipment. Further, embodiments of the inserts may include features that may abut, overlap, or include some other sort of geometry that creates a seal between the ends of the inserts so that pressurized fluid is contained within the flow bore of the inserts, advantageously allowing for use of the inserts with conduits and equipment with multi-directional flow and/or multiple inlets and outlets.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for transporting fluids, the system comprising:
a conduit or flow equipment comprising a flow bore; and
an insert disposed within the flow bore of the conduit or flow equipment, the insert comprising:
an internal structure, wherein the internal structure comprises a spring or a helically wound coil, the spring or coil having a spacing between adjacent portions of the spring or coil; and
an erosion or corrosion resistant coating disposed around the internal structure,
wherein the erosion or corrosion resistant coating has an inner surface defining a flow passage through the insert,
wherein the inner surface has a uniform diameter, and
wherein the insert is disposed inside the flow bore and provides erosion and/or corrosion resistance to the conduit or flow equipment.

2. The system of claim 1, wherein the spring is tensioned within the erosion or corrosion resistant coating.

3. The system of claim 1, wherein the internal structure comprises locator holes distributed around an end section of the internal structure.

4. The system of claim 1, wherein the erosion or corrosion resistant coating comprises a polymeric or rubber coating.

5. The system of claim 4, wherein the polymeric or rubber coating comprises a polyurethane, an epoxy, or a polyurea.

6. The system of claim 1, wherein the insert further comprise at least one tapered section configured to mechanically engage with the conduit or flow equipment and align or restrain movement of the insert.

7. The system of claim 1, wherein the insert further comprises a mechanical engagement, configured to fit into a corresponding feature of the conduit or flow equipment and to hold the insert in place.

8. The system of claim 1, comprising two or more inserts, wherein each of the insert is configured to form a seal along one or more respective interfaces formed between the insert and a corresponding end.

9. The system of claim 8, wherein the two or more inserts comprise complementary overlapping structures.

10. The system of claim 1, wherein the flow equipment comprises a pup joint, a tee, a cross, a manifold, or a y-splitter.

11. The system of claim 1, wherein the flow equipment further comprises a valve, the valve including an inlet flow bore, an outlet flow bore, and a flow control member, wherein the system includes an insert disposed in each of the inlet flow bore and the outlet flow bore, and wherein the inserts are configured to form a dynamic seal with the flow control member.

12. A system for transporting fluids, the system comprising:
 a flexible pipe;
 an adapter connected to a wellhead;
 an end connector connected to the adapter;
 a clamp connector holding the adapter and the end connector together;
 two or more inserts disposed within flow bores of the adapter and of the end connector, each of the two or more inserts comprising:
  an internal structure, wherein the internal structure comprises a spring or a helically wound coil, the spring or coil having a spacing between adjacent portions of the spring or coil; and
  an erosion or corrosion resistant coating disposed around the internal structure; and
 a metal spacer disposed on complementary overlapping structures of the two or more inserts and fit to a mechanical engagement of the insert,
 wherein the two or more inserts disposed inside the flow bores provide erosion and/or corrosion resistance to the flow bores, and
 wherein the metal spacer protects the clamp connector from erosion or corrosion.

13. The system of claim 12, wherein the two or more inserts further comprise an end portion configure to engage with an anti-extrusion ring.

14. The system of claim 12, each of the two or more inserts comprising at least one tapered section configured to mechanically engage with the flow bore of the flow equipment and align or restrain movement of the insert.

15. The system of claim 12, wherein the insert comprises a section configured to form a seal along one or more respective interfaces formed between the insert and a corresponding end.

16. The system of claim 12, wherein the insert comprises an end section configured to form a dynamic seal with a moving component of a flow equipment.

17. The system of claim 12, wherein the insert further comprises a mechanical engagement configured to fit into a corresponding feature of the flow equipment and to hold the insert in place.

18. A method for manufacturing an insert for providing corrosion and erosion resistance to flow equipment, the method comprising:
 disposing a helical structural component within an annular cavity of an injection molding apparatus;
 stretching and loading the helical structural component in tension using one or more locator holes to achieve a desired spacing and rigidity of the helical structural component;
 injecting a polymeric or rubber coating into the annular cavity; and
 solidifying the polymeric or rubber coating to form an insert comprising the tensioned helical structure within the solidified polymeric or rubber coating.

* * * * *